United States Patent [19]
O'Brien et al.

[11] Patent Number: 5,425,448
[45] Date of Patent: Jun. 20, 1995

[54] STORAGE PACKAGE WITH VARIABLE DEPTH COMPARTMENT

[75] Inventors: Patrick J. O'Brien, Hackensack, N.J.; Alvin Thomas, Pittsfield; George Rufo, Jr., Dalton, both of Mass.; Larry Durham, Terre Haute, Ind.

[73] Assignee: Ivy Hill Corporation, New York, N.Y.

[21] Appl. No.: 70,713

[22] Filed: May 28, 1993

[51] Int. Cl.⁶ .................. B65D 85/30; B65D 85/57; B65D 69/00
[52] U.S. Cl. .................... 206/232; 206/309; 206/313
[58] Field of Search .......... 206/232, 310, 309, 312, 206/313, 311, 444

[56] References Cited

U.S. PATENT DOCUMENTS

| | | | |
|---|---|---|---|
| 3,415,365 | 12/1968 | Faulkner | 206/444 |
| 4,365,708 | 12/1982 | Tyus | 206/232 X |
| 4,643,301 | 2/1987 | Hehn et al. | 206/232 |
| 4,817,079 | 3/1989 | Covington | 206/312 X |
| 4,819,799 | 4/1989 | Nomula et al. | 206/310 |
| 4,895,252 | 1/1990 | Nomula et al. | 206/310 |
| 5,188,228 | 2/1993 | Barrett | 206/310 |
| 5,188,230 | 2/1993 | O'Brien et al. | 206/312 |
| 5,205,405 | 4/1993 | O'Brien et al. | 206/312 X |
| 5,284,242 | 2/1994 | Roth et al. | 206/309 X |

FOREIGN PATENT DOCUMENTS

| | | | |
|---|---|---|---|
| 0375925 | 7/1990 | European Pat. Off. | 206/444 |
| 2184426 | 6/1987 | United Kingdom | 206/444 |

*Primary Examiner*—David T. Fidei
*Assistant Examiner*—BethAnne C. Cicconi
*Attorney, Agent, or Firm*—Amster, Rothstein & Ebenstein

[57] ABSTRACT

A storage package for an article and a booklet includes a pair of panels secured together and movable between a closed storage orientation, wherein the panels are substantially overlying with at least an article and a booklet supported by the article disposed intermediate the pair of panels, and an open use orientation, wherein the panels are not substantially overlying and the article and booklet are accessible. A fixed base formed of plastic defines a cavity with a bottom face mounted on one of the panels and an open top face. A floating holder formed of rigid plastic is disposed within the cavity intermediate the faces for receiving and maintaining thereon the article and booklet, the holder being movable between a plurality of positions variably spaced above the cavity bottom face. A spring secured to one of the base and holder biases the holder above the cavity bottom face, thereby to accommodate booklets of varying thickness.

36 Claims, 11 Drawing Sheets

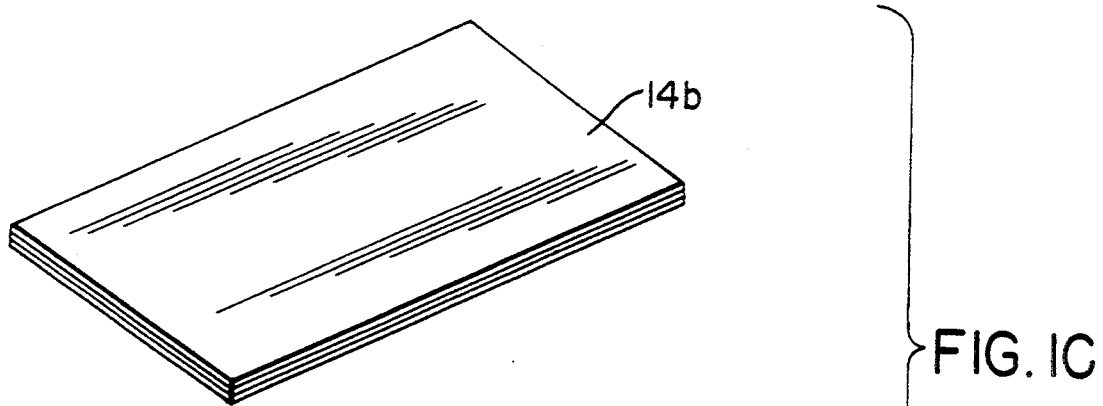
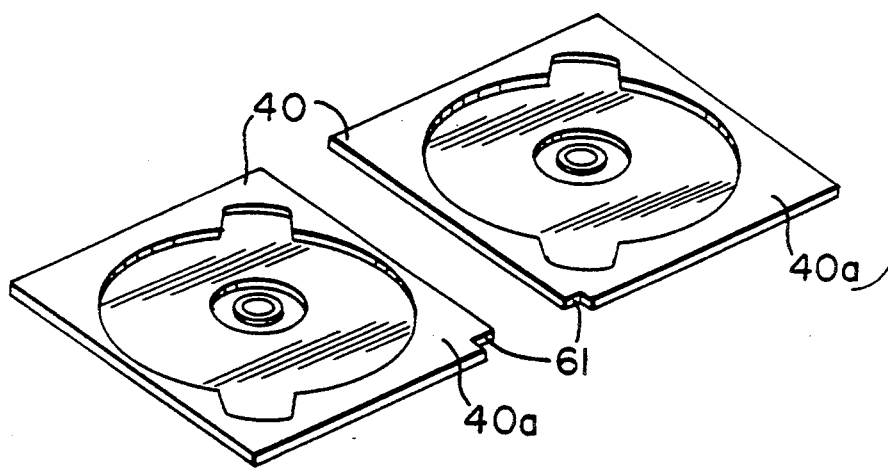
FIG. 1C
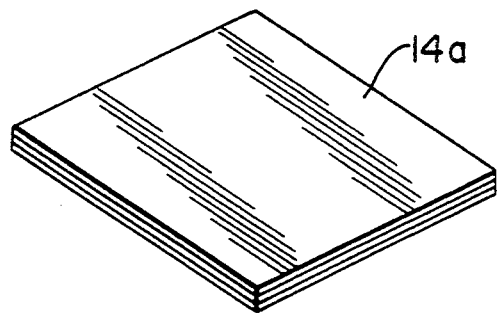
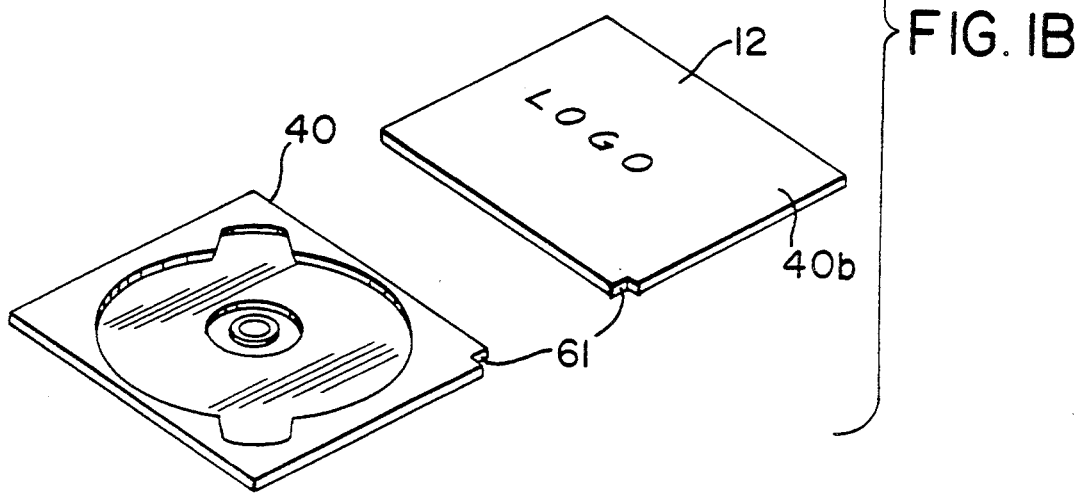
FIG. 1B

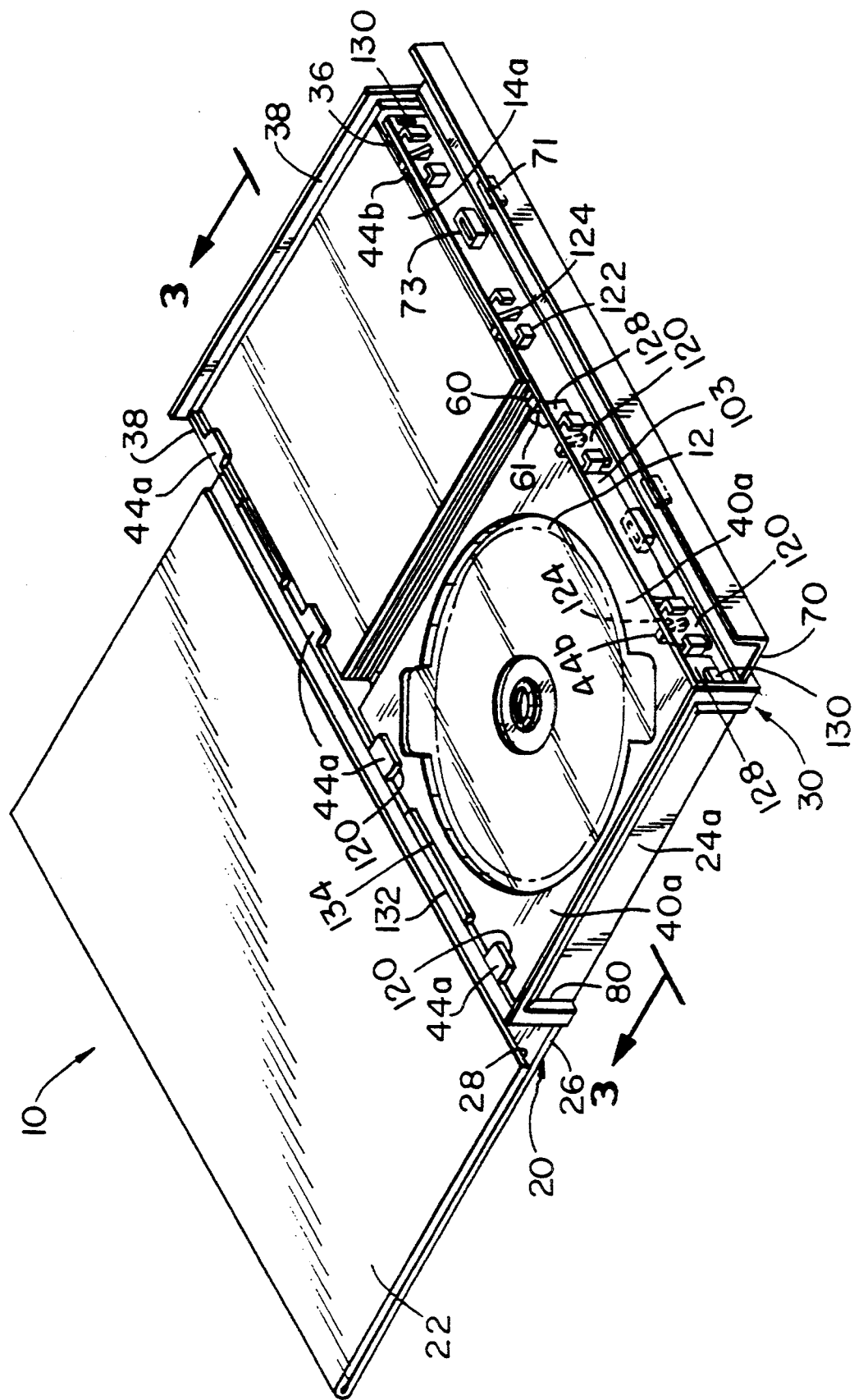

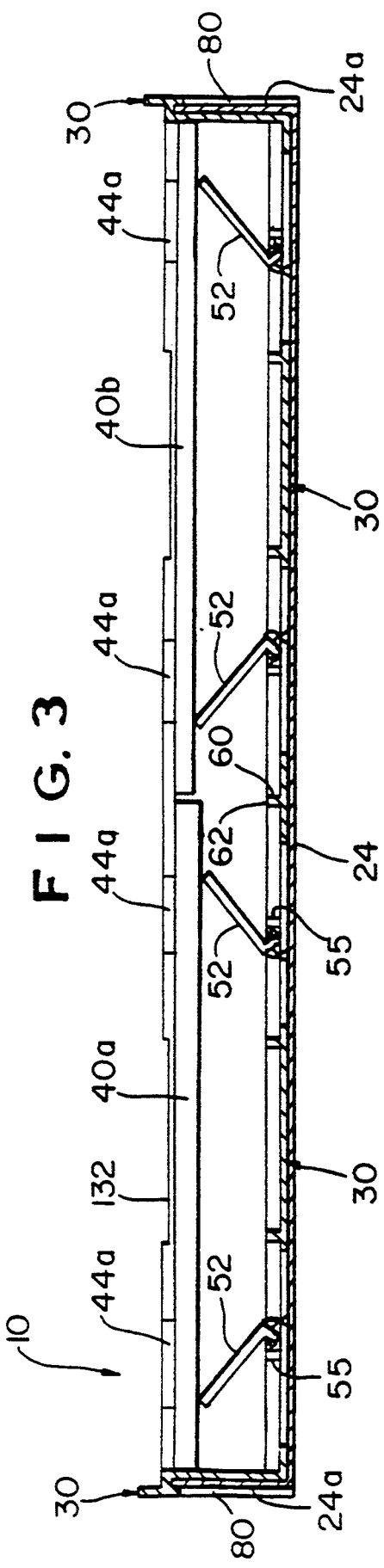
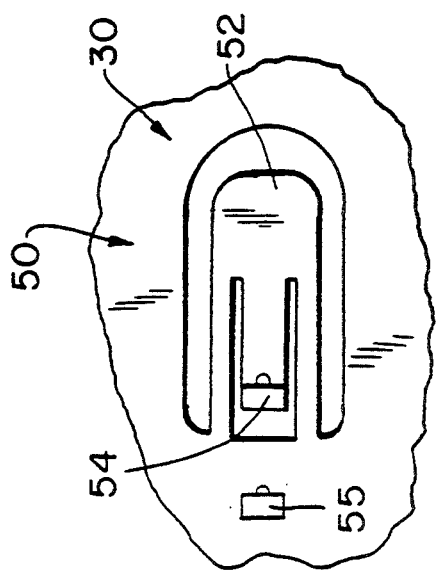
FIG. 3
FIG. 7
FIG. 6

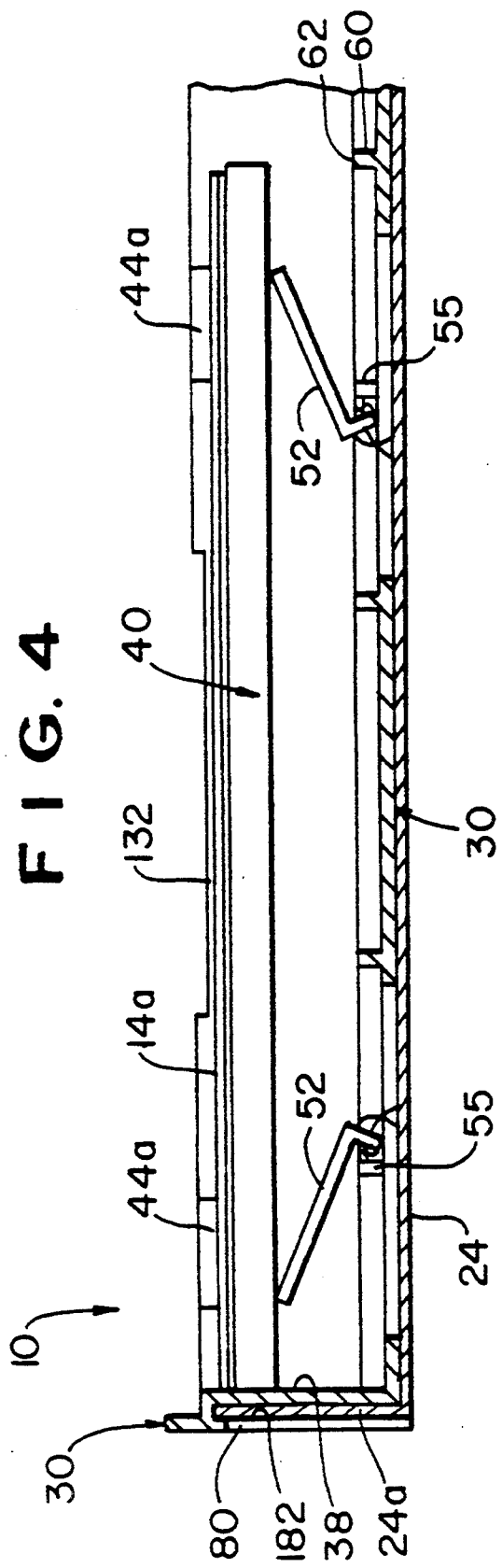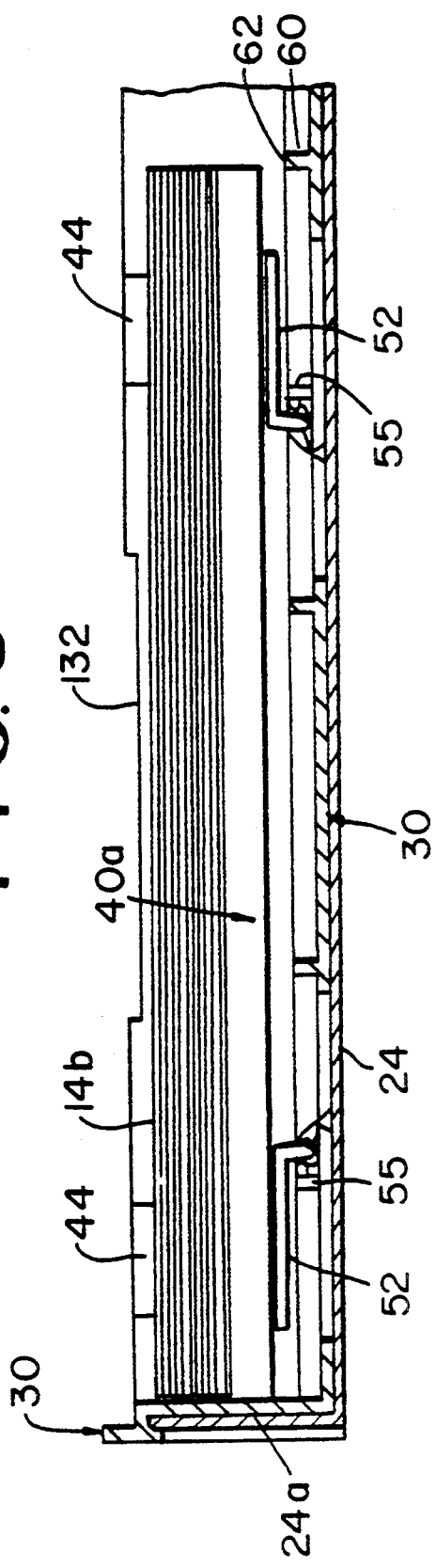

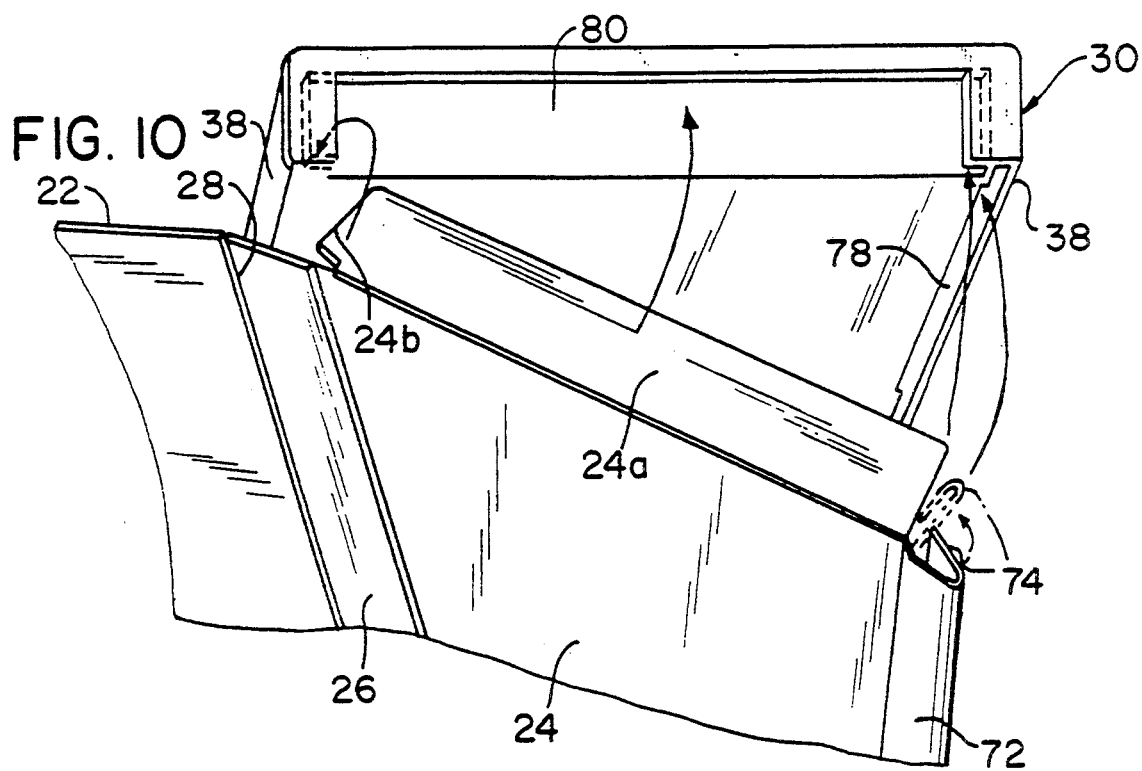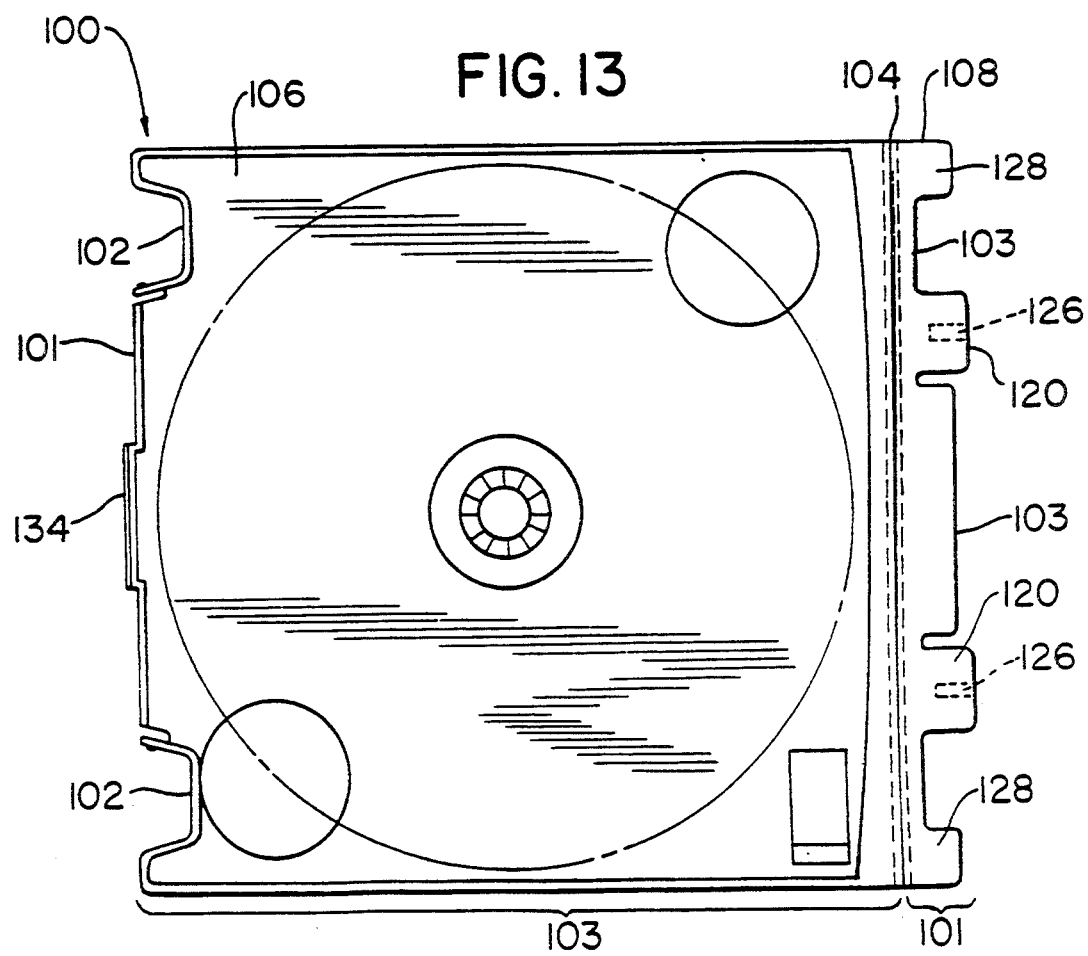

STORAGE PACKAGE WITH VARIABLE DEPTH COMPARTMENT

BACKGROUND OF THE INVENTION

The present invention relates to a storage package for an article such as a recording medium, and more particularly to such a storage package which can accommodate a booklet as well.

It is known to provide a storage package for an article in the form of a pair of panels secured together by a spine and movable between a closed storage orientation, wherein the panels are substantially overlying with the article disposed intermediate the pair of panels, and an open use orientation, wherein the panels are not substantially overlying and the article is accessible. Typically, a holder is mounted on one of the panels in order to receive and maintain thereon the article.

It is frequently desirable to include within a storage package a multipage booklet as well as the article. Where the article is a recording medium, the booklet may be associated with the article and describe the performer, the performance, or provide other related printed material. Accordingly, the other panel (that is, the panel on which the holder is not mounted) often includes a pocket or half-pocket configured and dimensioned to receive the booklet or defines by means of vertically extending side tabs a substantially open compartment from which the recording medium is excluded and which is suitable for releasably receiving and maintaining the booklet. These arrangements have not proven to be entirely satisfactory, as they require that the booklet be placed with some degree of care within the pocket, half-pocket or compartment.

On the other hand, if the booklet is simply placed between the upper face of the holder and the other panel (that is, the panel which does not mount the holder), then when the panels are put into the closed storage orientation, there will be a bulging of the other panel unless suitable space has been provided between the two panels, and more particularly between the upper surface of the recording medium on the holder and the other panel). While the holder may define a cavity of sufficient depth to receive both the article and the booklet thereabove so that the booklet does not extend above the upper face of the cavity and therefore does not cause the panels to bulge when they are in the closed storage orientation, this solution presents its own unique problems.

For example, in order to easily remove a compact disk from a holder, the edge of the compact disk must be readily accessible to the fingertips of the person attempting to remove it from the holder. Where the compact disk is disposed at the bottom of a cavity of substantially greater depth or thickness than the thickness of the compact disk, the edge of the compact disk is not readily accessible to the fingertips. Complicating this problem is the fact that a booklet may vary substantially in thickness—for example, from four pages to 80 pages. If the cavity is to have the potential to accommodate the 80-page booklet, which may be about 1/5" thick, the cavity in the holder must have a thickness of 1/5" plus the thickness of the compact disk. Thus, once a thick booklet is removed, the compact disk disposed at the bottom of the cavity is not only difficult to remove, but also presents an isolated, lonely appearance.

The overly deep cavity solution discussed above is furthermore inapplicable to storage packages where there are a plurality of the holders mounted on the same panel and in the same plane, for example, in order to allow the storage of two compact disks side-by-side in the package. In this situation, while it is possible to put a small booklet having a plan surface size about the size of a cavity in each of the holders, the presence of the common wall precludes the disposition within the cavities of a booklet larger in plan surface size than the size of one cavity.

Accordingly, it is an object of the present invention to provide a storage package for an article and a booklet wherein the booklet is supported on the article.

Another object is to provide such a storage package wherein, after removal of the booklet, the article is readily accessible.

A further object is to provide such a storage package which in one embodiment can accommodate a pair of the articles and a booklet which is approximately the size of the storage package.

It is also an object of the present invention to provide such a storage package which is one embodiment is adapted to accommodate a plurality of articles in a given plane and a booklet almost as large as the storage package itself.

It is another object to provide such a storage package which is inexpensive to manufacture and assemble and simple to use and maintain.

SUMMARY OF THE INVENTION

It has now been found that the above and related objects of the present invention are obtained in a storage package for an article and a booklet. The storage package comprises a pair of panels secured together and movable between a closed storage orientation, wherein the panels are substantially overlying with an article and a booklet supported by the article disposed intermediate the pair of panels, and an open use orientation, wherein the panels are not substantially overlying and the article and booklet are accessible. A fixed base formed of plastic defines a cavity with a bottom face mounted on one of the panels and an open top face. A floating holder formed of rigid plastic is disposed within the cavity intermediate the faces for receiving and maintaining thereon the article and receiving the booklet on the article, the holder being movable between a plurality of positions variably spaced above the cavity bottom face. Biasing means are secured to one of the base and holder for biasing the holder above the cavity bottom face, thereby to accommodate booklets of varying thickness and, when the booklet is removed, biasing the article towards the open cavity top face.

In a preferred embodiment, the panels are paperboard. The base additionally includes means limiting movement of the holder above a given height from the cavity bottom face. The holder is configured and dimensioned to receive and maintain thereon the article which may be a recording medium. The biasing means is of unitary, integral, one-piece construction formed in a single operation with one of the base and the holder, preferably the base.

The base may define a plurality of the cavities, an adjoining pair of the cavities sharing a common wall, and each of the cavities having a respective one of the holders and a respective one of the biasing means. The upper end of the common wall is preferably disposed lower than the upper ends of the other walls of the cavities so that a booklet having a greater plan dimension than either of the cavities may be disposed above the holders and the common wall upper end, but below the plane defined by the upper ends of the other walls of the cavities when the pair of panels is in the closed storage orientation.

One glueless embodiment of the present invention is a package comprising a pair of panels and a spine connecting the panels. The panels are movable between a closed orientation, wherein the panels are substantially overlying, and an open orientation, wherein the panels are not substantially overlying. A compartment is formed of plastic and mounted on one of the panels for receiving and maintaining an article therein, the compartment further defining an interior chamber having a passageway leading from the surface of the compartment into the chamber and a stop ledge. The panel defines at a free edge thereof a resiliently and reversibly bent edge portion configured and dimensioned to pass through the passageway into the chamber and to at least partially unbend within the chamber such that the free edge thereof engages the chamber ledge to resist removal of the edge portion from the chamber. Preferably the compartment is releasably mounted on the one panel without the use of glue, the passageway is narrower than the chamber, and the chamber, passageway and ledge extend substantially the length of an edge of the compartment.

Another glueless embodiment of the present invention is a package comprising a pair of panels and a spine connecting the panels. The panels are movable between a closed orientation, wherein the panels are substantially overlying, and an open orientation, wherein the panels are not substantially overlying. One of the panels defines on at least one side thereof a side flap generally perpendicular to the one panel, the side flap defining an extension. A compartment is formed of plastic and mounted on the one panel for receiving and maintaining an article. The compartment further defines on at least one side thereof a generally U-shaped slot configured and dimensioned to receive the side flap, the slot defining a slit configured and dimensioned to receive therein the side flap extension, thereby to lock the side flap in the slot. Preferably the slit is disposed on one end of the slot and the extension is disposed at one end of the side flap, the extension being easily insertable into the slit only when the one panel is non-parallel to the compartment.

A further embodiment of the present invention is a glueless package for an article comprising a pair of panels and a spine connecting the panels, the panels being movable between a closed orientation, wherein the panels are substantially overlying with an article disposed intermediate the pair of panels, and an open orientation, wherein the panels are not substantially overlying and the article is accessible. A compartment means is formed of plastic, mounted on one of the panels and defines a cavity for receiving and maintaining therein at least one of the articles. An insert has a major portion, a minor portion, and a living hinge securing the minor and major portions together. The minor portion is secured to the compartment means, the major portion defines on at least one surface thereof means for receiving and maintaining at least one of the articles thereon, and the living hinge enables the major portion to be pivoted relative to the minor portion and therefore the compartment means. Preferably the insert defines article receiving and maintaining means on each side thereof and is releasably secured to the compartment means.

BRIEF DESCRIPTION OF THE DRAWING

The above and related objects, features, and advantages of the present invention will be more fully understood by reference to the following detailed description of the presently preferred, albeit illustrative, embodiments of the present invention when taken in conjunction with the accompanying drawing wherein:

FIG. 1B is an isometric view of one configuration of the holders and the booklet of the storage package;

FIG. 1C is an isometric view of another configuration of the holders and the booklet of the storage package;

FIG. 2 is an isometric view of the storage package in an open-use orientation;

FIG. 3 is a sectional view, to an enlarged scale, taken along the line 3—3 of FIG. 2, showing the relative positions of the holder and the base in the absence of a booklet;

FIGS. 4 and 5 are fragmentary sectional views similar to FIG. 3 but showing the relative positions of the holder and the base in the presence of a thin booklet and a thick booklet, respectively;

FIGS. 6 is a fragmentary top plan view of a biasing finger of the base before it has been reversely bent;

FIG. 7 is a fragmentary side elevation view of the biasing finger after it has been reversely bent, with intermediate positions being illustrated in the phantom line;

FIG. 10 is an isometric view illustrating insertion of a side flap of the bottom panel into the slot of the base and the reversely bent front edge of the bottom panel into the front passageway of the base;

FIG. 13 is a top plan view of an insert; and

DETAILED DESCRIPTION OF THE PREFERRED EMBODIMENTS

Figure 1A:
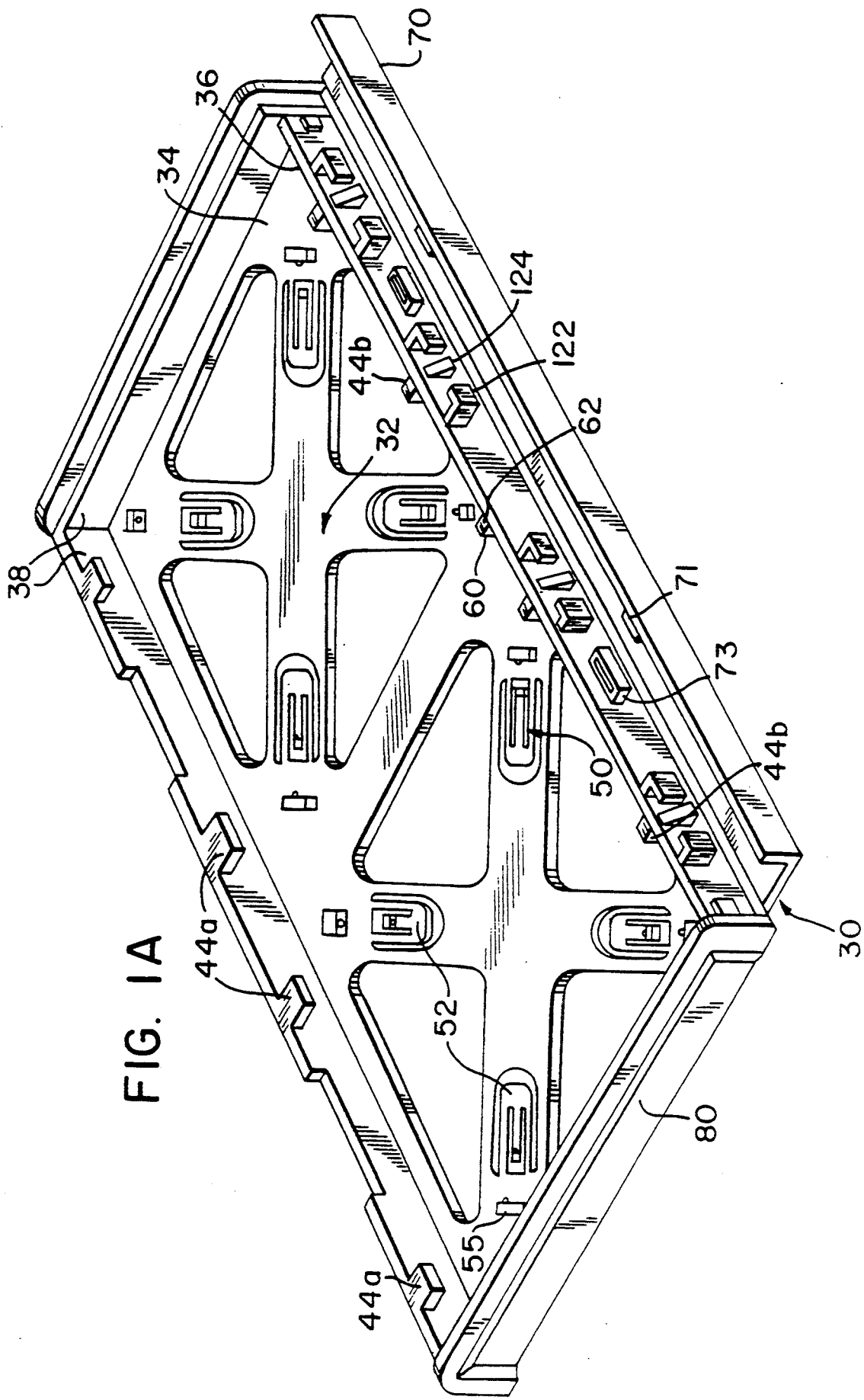
FIG. 1A is an isometric view of the base of a storage package according to the present invention.

Referring now to the drawing, and in particular to FIG. 2 thereof, therein illustrated is a storage package according to the present invention, generally designated by the reference numeral 10. The storage package 10 is configured and dimensioned to receive therein an article 12 and a booklet 14.

The article 12 is preferably a recording medium, and in particular a digital recording medium such as the compact disk (CD) illustrated. Compact disks presently come in a variety of different sizes (including a "microdisk") and may be used to digitally record sound (such as audio-CDs), images (such as photo-CDs) and data (such as CD-ROMs), and combinations thereof. While the present invention will be illustrated with respect to a compact disk, the principles thereof are applicable generally to other recording media and various other small articles of an entirely different nature—e.g., cosmetics, medical instruments, etc.

The booklet 14 is a multipage printed document which is typically (but not necessary) conceptually associated with the article 12. Thus, where the article is a CD of recorded music, the booklet may describe the composer, the orchestra, the performer, or like information which might be of interest to the intended listener. Alternatively, the booklet may not be conceptually associated with the article, but may simply be an advertisement for a related or even entirely different product, a poster, a premium or the like. The booklet consists of two or more pages (or a folded single page) and may be either very thin (about 0.015") or relatively thick (about 0.20"). Where the package 10 is adapted to receive only a single article 12 or a plurality of overlying articles 12, the planar dimensions of the booklet 14a (see FIG. 13) (i.e., its length and width) are typically substantially limited to the diameter of the article. On the other hand, where the package 10 is intended to receive a plurality of articles 12 in a common plane, as illustrated, the planar dimensions of the booklet 14b (see FIG. 1C) may be as large as the area occupied by the articles and typically therefore the planar dimensions of the entire storage package 10.

Figure 14:
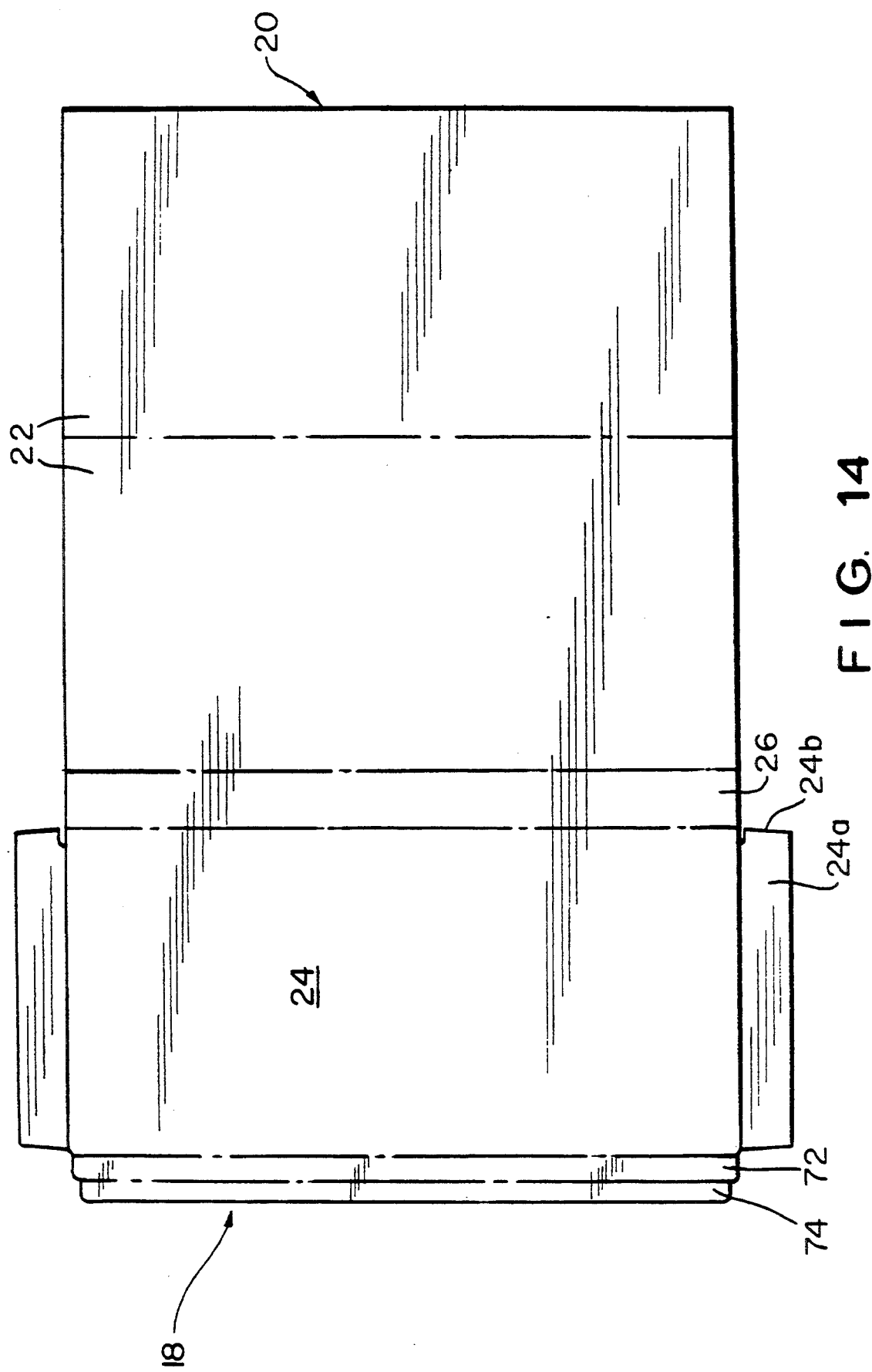
FIG. 14 is a top plan view of a blank for the cover.

The package 10 includes an intermediate formed substantially of plastic and a cover typically formed of paperboard. The intermediate and the cover may be formed at the same or different manufacturing locations. The cover, generally designated 20, includes a pair of panels 22, 24 (the latter best being illustrated in FIG. 8) secured together by a spine 26. The cover 20 is preferably formed from a blank 18 (see FIG. 14). The top panel 22 and the lower panel 24 are each pivotable relative to the spine 26 and, to that end, may be connected thereto by living hinges 28. The panels 22, 24 are movable between a closed storage orientation wherein the panels are substantially overlying with an article 12 and a booklet 14 supported by the article disposed immediate the pair of panels 22, 24, and an open use orientation wherein the panels are not substantially overlying and the article and the booklet are accessible (although the booklet 14 may have to be removed prior to removal of the article 12). The cover 20 is preferably made of paperboard for ecological reasons, although alternatively it may be made of plastic or like materials. The panels 22, 24 may be of a common thickness. However, as the bottom panel 24 will be rigidified by the base 30 disposed thereon (as will be explained hereinafter), the top panel 22 may be of double thickness (i.e. folded over itself) in order to provide a desirably higher level of rigidity thereto. Additionally, even though the cover is formed of paperboard coated on only one side to receive printing, the folding over of the front panel 22 provides both major surfaces of the panel 22 with a coated surface adapted to be printed (just like the exposed surface of panel 24). Typically panels 22, 24 are of the same configuration and dimension in length and width, with the spine 26 being selected to enable the two panels to overlie with the base therebetween.

Referring now also to FIG. 1A a fixed base, generally designated 30, is mounted on the bottom panel 24. The base 30 defines a cavity, generally designated 32, having a bottom face 34 mounted on the bottom panel 24, an open top face 36 and a sidewall 38 intermediate the two faces 34, 36. The cavity 32 is illustrated as square, but alternatively it may be cylindrical, polygonal or the like. The plan outer dimensions of the cavity 32 (that is, its length and width) are preferably only slightly less than those of the bottom panel 24, and the plan inner dimensions are at least as great as the plan dimensions of the article 12. The height or depth of the cavity 32 intermediate the faces 34, 36 is at least equal to the combined, and optionally partially telescoped, height of the article 12, the booklet 14, and the floating holder generally designated 40 (to be described hereinafter). The base 30 is preferably formed of a plastic which is at least semi-rigid as it is important that the base retain its general configuration during use.

A floating holder, generally designated 40, is disposed within the cavity 32 intermediate the faces 34, 36 and is movable between a plurality of positions variably spaced above the cavity bottom face 34 and below the cavity top face 36. The holder 40 is preferably formed of a rigid plastic having plan dimensions slightly less than the cavity 32 so that the holder is snugly received within the sidewall 38 of the cavity 32, yet substantially free to move upwardly and downwardly therein under the influence of the biasing means (to be described hereinafter) or finger pressure, respectively.

There are at least two different types of holders 40, but each storage package 10 preferably includes at least one holder 40a of the first variety. Thus, where the base 30 defines only a single cavity 32 and there is accordingly only room for one holder 40, preferably the holder 40a will be employed. As illustrated in FIGS. 1B and 1C, the holder 40a has an upper face which is configured and dimensioned to receive and maintain thereon the article 12. Where the article 12 is a CD, the holder 40 may define a recess in its upper surface suitable for receiving the CD therein and an upwardly extending boss configured and dimensioned to pass through the central aperture of the CD in order to releasably maintain the CD within the recess. Additionally, the holder 40a is configured and dimensioned to receive the booklet 14 over the article 12, such that the booklet 14, article 12, and holder 40a are all disposed within the cavity 32. They are typically at least partially telescoped in the sense that at least the article 12 is disposed within a recess in the upper surface of the holder 40a. The holder 40a may additionally define a second recess, above and outwardly of the first recess, for receipt of a thin booklet. In this manner the cavity 32 would only require a depth sufficient to accommodate the holder 40a and the difference of thickness between a thin booklet and a thick booklet.

Where the base 30 defines a plurality of cavities 32, each with its own holder 40, preferably one holder 40 will be of the first type 40a and the other holder 40 may be another of the first type 40a (see FIG. 1B) or one of a second type 40b (see FIG. 1C). As illustrated in FIG. 1B, the second holder type 40b does not hold a detachable article 12, but rather simply presents a logo, design, advertisement or the like 42 disposed on the upper face thereof, for example, by printing, embossing, stamping, or the like. In the second type of holder 40b, the portion containing the logo, design, or the like 42 may in fact be detachable from the remainder of the holder 40b and thus act as another article 12, but generally it is not intended to be frequently removed, re-inserted, and re-removed as in the case of the article 12 which is received and maintained on the first type of holder 40a.

On each of a pair of opposed walls, the base 30 includes inwardly extending flanges or fingers 44, which partially extend over cavity 32, partially overlie the holder 40, and preclude movement of the holder 40 above a given height from the cavity bottom face 34, thereby insuring that the holder 40 does not become separated from the base 30 under the influence of the biasing means to be described. The fingers 44a on one side (illustrated here as adjacent the spine 26) are preferably of greater size in length and width than the fingers 44b on the other side (illustrated here as remote from the spine 26) as the fingers 44a preferably assist in holding the booklet 14 in place while the fingers 44b do not.

Biasing means, generally designated 50, are secured to the upper surface of the bottom face of the base 30, the bottom face of the holder 40 (whether it be the holder 40a or 40b), or both, for biasing the holder 40 above the cavity bottom face 32. This permits the package 10 in the closed storage orientation to accommodate any of a variety of booklets 14 of varying thickness between the fingers 44a and the upper surface of the holder 40 (or the upper surface of the article 12 disposed on the holder 40) so that the accommodated booklet 14 does not interfere with the two panels 22, 24 lying in parallel planes—that is, without the presence of the booklet 14 causing the upper panel 22 to bulge upwardly when it is moved into the closed storage orientation. When the booklet 14 is removed from the top of the article 12, the biasing means 50 pushes the holder 40, and any article 12 thereon, upwardly, towards the open cavity top face 36 until further upward movement is precluded by the abutting engagement of fingers 44 and depressions 46.

A variety of different biasing means 50 may alternatively be employed to achieve the purposes of the present invention. Thus, a central compression spring extending vertically between the base and the holder, or a plurality of such springs, with one spring disposed in each corner, may be used for upward biasing of the holder 40 relative to the base 30. Alternatively, a spaced apart pair of parallel leaf springs may be employed with each end of each leaf spring exerting an upward pressure on one corner of the holder and the central or bight portion of each leaf being secured to the base—for example, by gluing, sonic welding, or press fit onto a boss of the base. However, each of these conventional biasing means requires the production of an additional element which must then be secured to either the base, the holder, or both.

Figure 9:
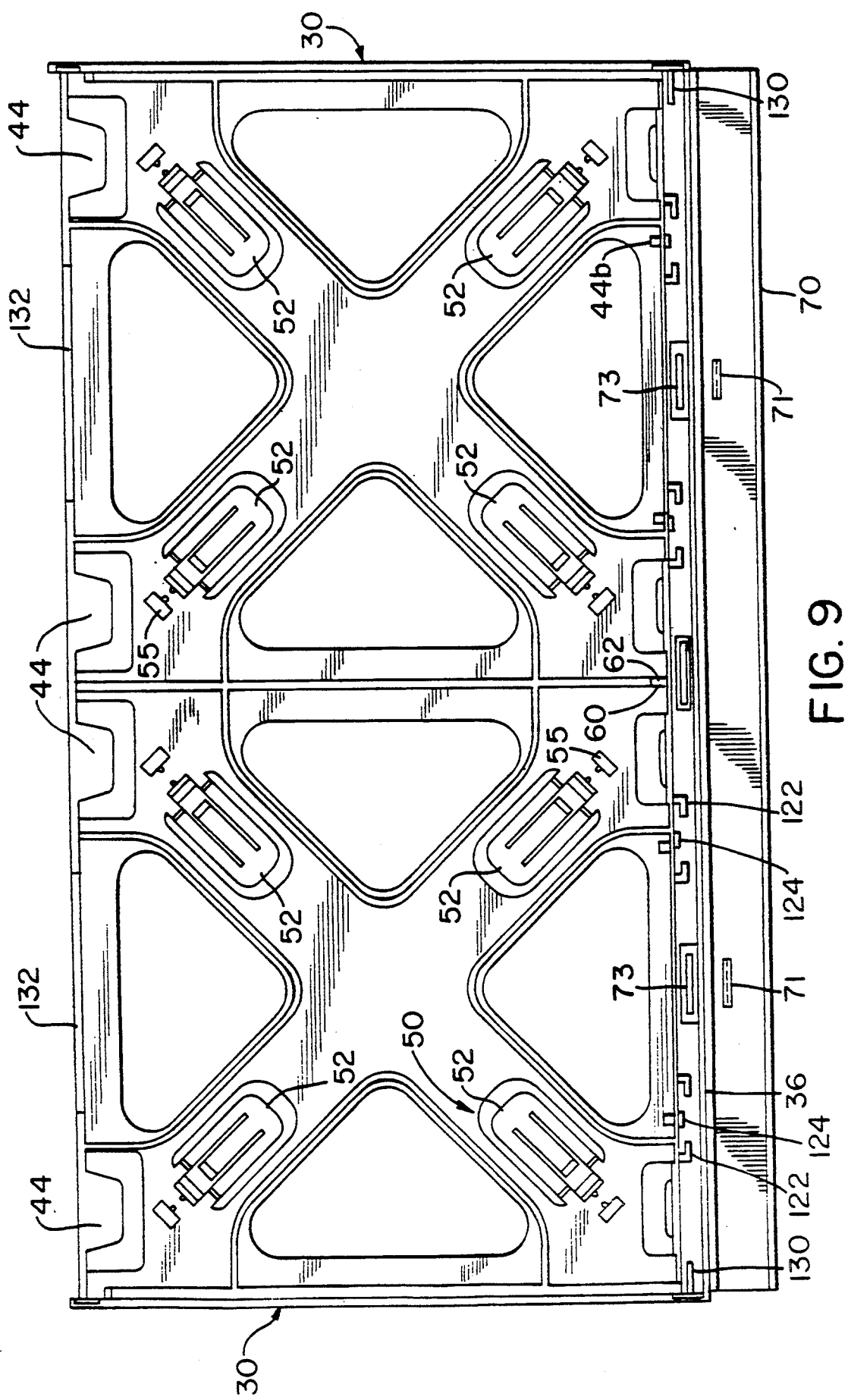
FIG. 9 is a top plan view of the base.

Accordingly, referring now to FIGS. 6 and 7, a preferred biasing means 50 is of unitary, integral, one-piece construction formed in a single operation with either the base 30 or the holder 40, preferably (as illustrated) the base. The preferred biasing means 50 is formed of four resiliently bent-back arms 52 of the base 30 which, in attempting to resume their original orientation, bias the holder 40 thereover upwardly. Each arm 52 is easily and economically created simply by providing a U-shaped arm 52 (cut away from the remainder of the base except at the ends of the legs thereof) during molding of the base, as illustrated in FIGS. 1A, 6, and 9, and then bending the arm 52 reversely prior to insertion of the holder 40 into the base cavity 32, as illustrated in FIGS. 3–5 and 7. Preferably the reversely bent arm 52 includes a transverse finger 54 which limits reverse bending of the arm 52 under the influence of the holder 40 and catches under a ramp 55 to maintain the arm 52 reversely bent until the holder 40 is placed thereover. To enable use of the preferred biasing means, the base 30 must be formed of a plastic affording the flexibility and resiliency required for biasing. Preferred plastics are polypropylene and polystyrene.

Where, as illustrated, the storage package 10 is to contain a plurality of the articles 12 in a single plane, the base 30 will define a plurality of the cavities 32, each of the cavities 32 having a respective one of the holders 40 and a respective one of the biasing means 50. Adjoining pairs of the cavities 32 will share a common wall 60. The upper end 62 of the common wall 60 is preferably disposed lower than upper ends of the other walls of the cavities 32 so that a booklet 14b (see FIG. 1C) having a greater plan dimension that either of the cavities 32 may be disposed above the holders 40 (and any articles 12 on the holders 40) and above the common wall upper end 62, but below the plane defined by the upper ends of the other walls of the cavities 32. Thus, when the pair of panels 22, 24 is in the closed storage orientation, the booklet 14 may be disposed below the upper panel 22 and below the upper walls of the cavities 32 (except for the common wall 60), but above the holders 40 and any articles 12 thereon. In this manner, the storage package 10 may accommodate a booklet 14b which is almost the full size of the base 30 (i.e. almost the full size of the storage package 10), allowing the booklet 14b to pass from one cavity 32 to the adjoining cavity 32 by extending over the depressed upper end 62 of the common wall 60. When the package 10 is configured and dimensioned to hold, say, four articles 12 in a common plane in a rectangular configuration, there will be four common walls 60 depressed below the other cavity walls, so that a booklet 14 the size of about four holders 40 may be disposed in the storage package 10. Of course, if desired, a single booklet 14a (see FIG. 1b) may be disposed over one of the holders 40 or, if desired, two booklets 14a may be disposed in the storage package, one booklet 14a over each of the holders 40.

It will be appreciated that the common wall 60 functions only to maintain the holders 40 in the appropriate orientation within the cavities 32 and, therefore, need not be a full wall extending in the entire width or length of the cavities. Thus, as illustrated, the common wall 60 may simply be a partial wall extending a fraction of an inch inwardly from a side of the cavities. Similarly, in order not to waste a space between the holders 40 equal to the thickness of the common wall 60, as illustrated, each of the adjacent holders 40 may define an adjoining notch 61 adapted to receive therebetween the partial common wall 60. This permits the adjacent holders 40 to be closely adjacent, without any wasted space, even though there is a partial common wall 60 therebetween to orient them.

Figure 8:
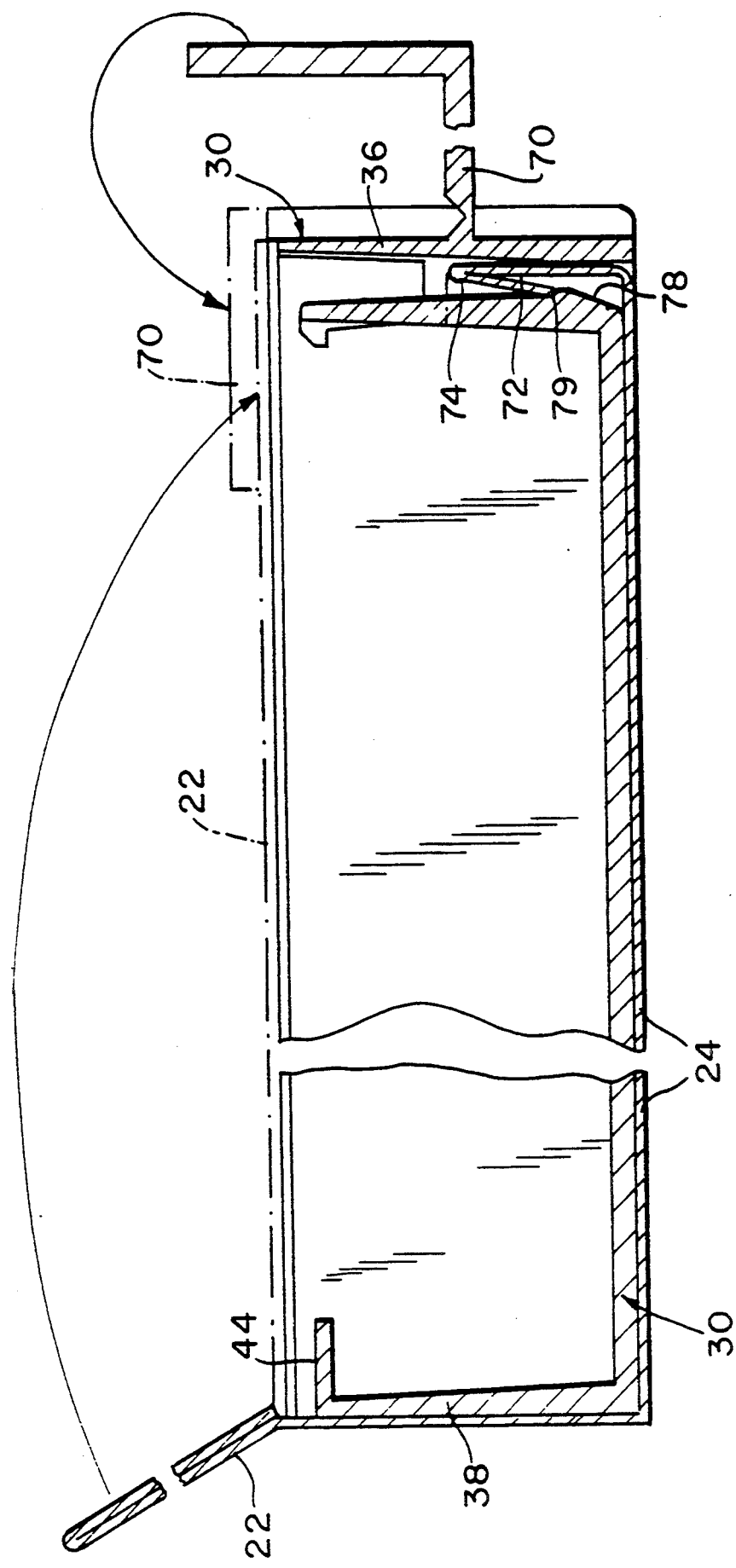
FIG. 8 is a fragmentary sectional view illustrating the connection of the cover to the base and the movement of the top panel and end cap locking mechanism into the closed storage orientation.

Releasable locking means 70 are provided to enable the panels 22, 24 of the cover to remain in the closed storage orientation until it is desired to move the panels to the open use orientation. While a variety of conventional closure means may be used for this purpose, preferably the releasable locking means is an end cap of an integral, unitary one-piece construction with the base 30 and formed in a single operation therewith, as described in commonly owned U.S. Pat. No. 5,188,230. As illustrated in FIG. 8, the releasable locking means 70 is pivotable from an open position (as illustrated in FIGS. 1A and 2), relative to the base 30, until it partially overlaps the upper panel 22, thereby to maintain the upper panel 22 parallel to the lower panel 24 against accidental displacement by virtue of at least one resilient male member 71 on the end cap which is received in at least one female slot 73 of the base 30. As best seen in FIG. 9, an appropriate number of the male member/female slot pairs 71, 73 are used to effect releasable locking by the locking means 70, a greater number of pairs 71, 73 typically being required for longer packages 10, preferably one pair 71, 73 per cavity 32.

As earlier noted, the base 30 is mounted on the bottom panel 24. The base 30 may be secured to the bottom panel 24 by conventional means such as glue, adhesive, and the like. However, in a preferred glueless, and therefore ecologically acceptable, embodiment of the present invention the paperboard portion of the invention (that is, the cover 20 including the panels 22, 24 and spine 26) is readily detachable from the plastic portion (including the base 30, holders 40, and biasing means 50). While this preferred glueless embodiment may be more difficult to construct and assemble, it facilitates compliance with the ecological laws of various countries requiring the separate disposal of paperboard and plastic for recycling purposes.

Referring now to FIG. 8 in particular, the bottom panel 24 defines an upwardly turned lip 72 at the front end thereof, the front lip having a reversely bent edge 74. With the edge 74 pressed against the lip 72, the lip 72 and edge 74 are inserted through a tapered passageway 76 in the front end of the base 30. Once inserted through the passageway 76 and into the less restrictive gap 78, the natural resiliency of the paperboard causes the free end of the edge 74 to separate from the lip 72 and become trapped therein by a ledge 79 in the passageway 76, thereby to secure the bottom panel 24 to the base 30 against accidental displacement.

Additionally, each of the short or transverse sides of the base 30 defines a recessed portion 80 and a U-shaped peripheral slot 82 about the recessed portion 80 for receipt of a side flap 24a projecting upwardly from the transverse edge of the bottom side panel 24. The side flaps 24a of the bottom panel 24 may contain printed material briefly identifying the article 12 (e.g., the subject matter of the recording medium within the package) to facilitate identification thereof without opening the package. Each side flap 24a preferably includes an extension 24b, and each peripheral slot 82 preferably defines a slit 82a therein. During insertion of side flap 24a into slot 82, extension 24b is first slipped through slit 82a to lock the flap 24a into slot 82. The retention by the slot 82 of the side flaps 24a assists in maintaining the bottom panel 24 flat against the bottom of the base 30. If desired, a small amount of adhesive may be used to assist in securing the side flaps 24a in the slots 82, where permissible under local law.

To use the storage package 10, the releasable locking means 70 is released, and the upper panel 22 is moved so that the cover 20 is in the open use orientation. The booklet 14 is removed from under fingers 44a, thereby either exposing the article 12 for removal from the holder 40a or simply exposing the logo 42 of the holder 40b. Removal of booklet 14 enables the resilient reversely bent fingers 52 of the base 30 to slide the holders 40 upwardly within their respective cavities 32 until the holders 40 are engaged by the fingers 44 of the base 30. Thus, after removal of booklet 14, the article 12 is presented in a convenient disposition for removal from the holder 40a, and the logo 42 is presented in a prominent, easily viewable position by the holder 40b.

To close the storage package 10, the article 12 is optionally placed on the holder 40a, and the booklet 14a is placed over one of the holders 40 (and any article 12 therein) or the booklet 14b is placed over a plurality of the holders (including the common walls 60 therebetween),. The booklet 14a, 14b is then slipped under fingers 44a. To the extent that the thickness of the booklet 14 so requires, a downward motion by the user on the booklet 14 will act on the holder(s) (optionally via any article(s) on the holder(s)) to force the holder(s) further downwardly into the cavity(s) 32, easily overcoming the upward biasing of the biasing means 50, and enabling the booklet 14 to then slip laterally under fingers 44a. Finally, as illustrated in FIG. 8, the upper panel 22 is moved to the closed storage orientation, parallel to the lower panel 24, and the locking mechanism 70 is pivoted to partially overlap the same. It will be appreciated that, depending upon the thicknesses of the various holders 40 (as illustrated in FIG. 3) or the thickness of a booklet 14 over a particular holder, the relative positions of the holders 40 within the cavities 32 may vary from one cavity 32 to another.

Figure 11:
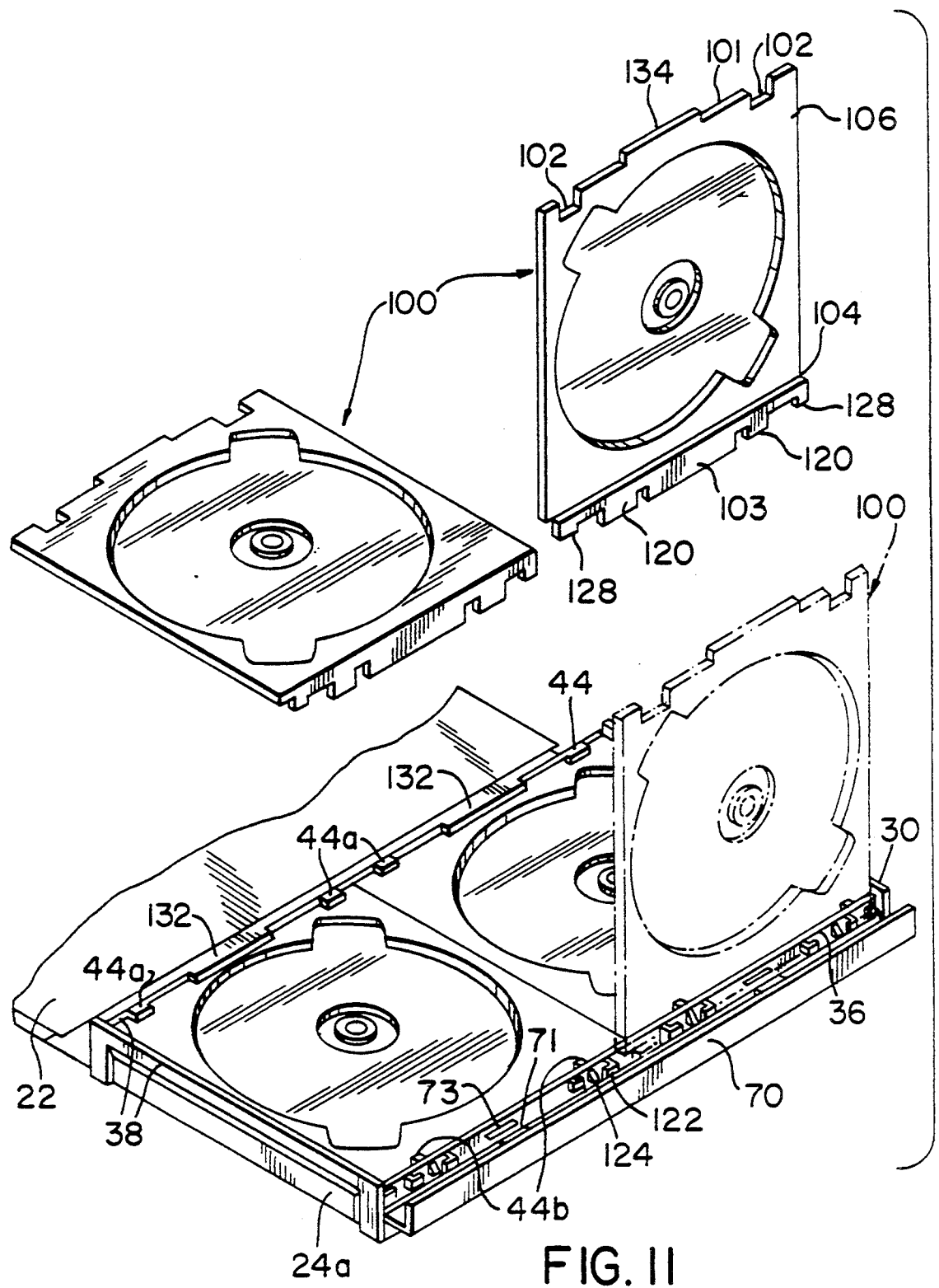
FIG. 11 is an exploded isometric view of the package with two inserts, one insert also being illustrated in phantom line attached to the package.
Figure 12:
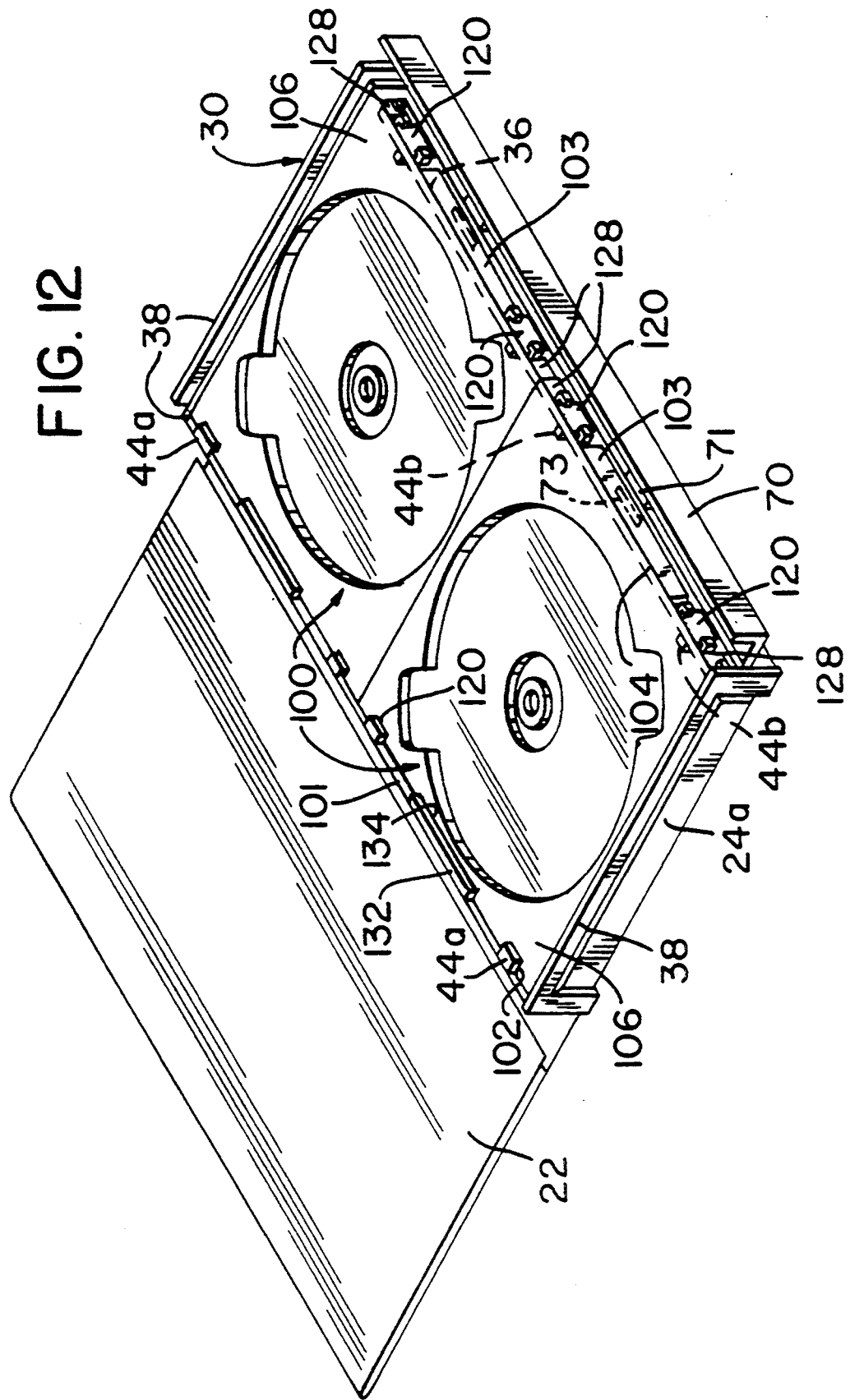
FIG. 12 is an isometric view of the package with the inserts in an appropriate storage position.

The package 10, as described hereinabove, having a width of about X articles 12 and a length of about Y articles 12 can hold only X times Y articles. Thus, the package 10 as described hereabove is suitable for holding at most two CD's since it has the width of about one CD and a length of about two CD's (assuming that both holders are of the first type 40a suitable for holding a CD). Accordingly, in a preferred embodiment of the present invention illustrated in FIGS. 11–13 a snap-in holder insert 100 is provided to enable the number of CD's held to be trebled. Insert 100 is similar to the first type of holder 40a except that it defines a boss projecting outwardly from each opposed surface and configured and dimensioned to pass through the central aperture of a CD for retaining the same. Typically there is no recess on either side of insert 100 to receive the CD, as illustrated in FIG. 13, but such recesses are optionally provided, as illustrated in FIGS. 11 and 12. Accordingly, two CD's may be secured to the insert 100 over each holder 40a, thereby trebling the capacity of the storage pack.

On the side 101 of the insert 100 adjacent the spine 26, cutouts 102 correspond to fingers 44a so that the insert 100 does not project above the fingers 44a and thereby distort the upper panel 22 when the package 10 is in its closed orientation. Rather the side 101 of the insert 100 adjacent spine 26 slides downwardly past the fingers 44a, preferably atop (but possibly below) the booklet 14. The wall of the cavity 32 remote from spine 26 is preferably lower than the wall adjacent spine 26 to permit insert 100 to lie flat, parallel to bottom panel 24 and holder 40. Adjacent the side 103 of the insert 100 remote from spine 26, the insert 100 defines a living hinge 104 which enables the major portion 106 of the insert 100 to be moved between a position parallel to the bottom panel 24 and holder 40 to a position wherein it stands upwardly at a right angle thereto (as seen in FIG. 11) or even to the side of the package 10 in order to facilitate removal of the article 12 from the then upper (and previously lower) surface of the insert 100.

The side 103 of the insert 100 remote from spine 26 and on the other side of the living hinge 104 defines a minor portion 108 of the insert 100. The minor portion 108 and the base 30 are provided with means for securing together the insert 100 and the base 30. As best illustrated in FIGS. 9 and 13, the insert minor portion 108 is provided with at least one resilient tab 120 which is inserted into a slot 122 on the base 30. After a certain point of insertion, a ramp 124 within slot 122 is received in a notch 126 on the rear surface of the tab 120 to lock the insert 100 to the base 30. To prevent outward bowing of the insert ends 128, retainers 130 (see FIG. 9)

project upwardly from base 30 in front of the insert ends 128. Clearly a variety of different means may be provided for providing a locking engagement between the insert 100 and the tray 30, as will be appreciated by those skilled in the connector arts. While typically the insert is intended to remain associated with the tray, if desired for particular applications the means securing the insert and the tray together may be releasable to enable subsequent intentional release of the insert from the base.

Pivoting of the major portion 106 of insert 100 relative to the minor portion 108 thereof by a user's finger is facilitated by a depression 132 formed in the top of the cavity sidewall 38 adjacent spine 26 and a finger-catchable ledge 134 projecting thereover from the side of the major insert portion 106 remote from the living hinge 104 when the insert 100 is parallel to the bottom panel and overlying the base.

Prior to their assembly with the cover 20, the fixed base 30, the holders 40, the biasing means 50, the locking means 70 and any insert 100 may be collectively referred to as the "intermediate", ready for assembly with the cover 20. Thus the intermediate constitutes a structure formed as a necessary stage in the manufacture of the desired end product—namely, the package assembly including both the cover and the intermediate.

To summarize, the present invention provides a storage package for an article and a booklet wherein the booklet is supported on the article, but, after removal of the booklet, the article is readily accessible. In one embodiment the storage package can accommodate a plurality of articles and a booklet which is approximately the size of the storage package. The storage package is inexpensive to manufacture and assemble and simple to use and maintain.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A storage package for an article and a booklet, comprising:
   (A) a pair of panels secured together and movable between a closed storage orientation, wherein said panels are substantially overlying with an article and a booklet supported by the article disposed intermediate said pair of panels, and an open use orientation, wherein said panels are not substantially overlying and the article and booklet are accessible;
   (B) a fixed base formed of plastic and defining a cavity, said cavity having a bottom face mounted on one of said panels and an open top face;
   (C) a floating holder formed of rigid plastic and disposed within said cavity intermediate said faces for receiving and maintaining thereon the article and receiving the booklet over the article, said holder being movable between a plurality of positions variably spaced above said cavity bottom face; and
   (D) biasing means secured to one of said base and holder for biasing said holder above said cavity bottom face, thereby to accommodate booklets of varying thickness and, when the booklet is removed, biasing said article towards said open cavity top face.

2. The package of claim 1 wherein said base additionally includes means for limiting movement of said holder above a given height from said cavity bottom face.

3. The package of claim 1 wherein at least one of said movement limiting means releasably secures the booklet atop said holder.

4. The package of claim 1 wherein said base defines a plurality of said cavities, each of said cavities having a respective one of said holders and a respective one of said biasing means.

5. The package of claim 4 wherein said base defines an adjoining pair of said cavities sharing a common wall and having other walls, the upper end of said common wall being disposed lower than the upper ends of the other walls of said cavities so that a booklet having a greater plan dimension than either of said cavities may be disposed above the articles on said holders and said common wall upper end, but below a plane defined by said upper ends of said other walls of said cavities when said pair of panels is in said closed storage orientation.

6. The package of claim 1 wherein said holder is configured and dimensioned to receive and maintain thereon the article.

7. The package of claim 1 wherein the article is a recording medium, and said holder is configured and dimensioned to receive the recording medium.

8. The package of claim 1 wherein said biasing means is of unitary, integral, one-piece construction formed in a single operation with one of said base and said holder.

9. The package of claim 1 wherein said biasing means is of unitary, integral, one-piece construction formed in a single operation with said base.

10. The package of claim 1 wherein said panels are paperboard.

11. A storage package for a recording medium and a booklet, comprising:
   (A) a pair of panels secured together and movable between a closed storage orientation, wherein said panels are substantially overlying with a recording medium and a booklet associated with and supported by the recording medium disposed intermediate said pair of panels, and an open use orientation, wherein said panels are not substantially overlying and the article and booklet are accessible;
   (B) a fixed base formed of plastic and defining a cavity, said cavity having a bottom face mounted on one of said panels and an open top face, said base including means for limiting movement of said holder above a given height from said cavity bottom face and releasably securing the booklet atop a holder;
   (C) a floating holder formed of rigid plastic and disposed within said cavity intermediate said faces for receiving and maintaining thereon the recording medium and receiving the booklet over the article, said holder being movable between a plurality of positions variably spaced above said cavity bottom face, said holder being configured and dimensioned to receive the recording medium; and
   (D) biasing means for biasing said holder above said cavity bottom face, thereby to accommodate booklets of varying thickness and, when the booklet is removed, biasing said article towards said open cavity top face, said biasing means being of unitary, integral, one-piece construction formed in a single operation with said base.

12. The package of claim 11 wherein said base defines an adjoining pair of said cavities sharing a common wall and having other walls, each of said cavities having a respective one of said holders and a respective one of said biasing means, the upper end of said common wall being disposed lower than the upper ends of the other walls of said cavities so that a booklet having a greater plan dimension than either of said cavities may be disposed above the articles on said holders and said, common wall upper end, but below a plane defined by said upper ends of said other walls of said cavities when said pair of panels is in said closed storage orientation.

13. A storage package intermediate for use with a pair of panels secured together and movable between a closed storage orientation, wherein the panels are substantially overlying with an article and a booklet supported by the article disposed intermediate the pair of panels, and an open use orientation, wherein the panels are not substantially overlying and the article and booklet are accessible; said intermediate comprising:
(A) a fixed base formed of plastic and defining a cavity, said cavity having a bottom face configured and dimensioned to be on one of the panels and an open top face;
(B) a floating holder formed of rigid plastic and disposed within said cavity intermediate said faces for receiving and maintaining thereon the article and receiving the booklet over the article, said holder being movable between a plurality of positions variably spaced above said cavity bottom face; and
(C) biasing means secured to one of said base and holder for biasing said holder above said cavity bottom face, thereby to accommodate booklets of varying thickness and, when the booklet is removed, biasing the article towards said open cavity top face.

14. The intermediate of claim 13 wherein said base additionally includes means for limiting movement of said holder above a given height from said cavity bottom face.

15. The intermediate of claim 13 wherein at least one of said movement limiting means releasably secures the booklet atop said holder.

16. The intermediate of claim 13 wherein said base defines a plurality of said cavities, each of said cavities having a respective one of said holders and a respective one of said biasing means.

17. The intermediate of claim 16 wherein said base defines an adjoining pair of said cavities sharing a common wall and having other walls, the upper end of said common wall being disposed lower than the upper ends of the other walls of said cavities so that a booklet having a greater plan dimension than either of said cavities may be disposed above the articles on said holders and said common wall upper end, but below a plane defined by said upper ends of said other walls of said cavities when the pair of panels is in said closed storage orientation.

18. The intermediate of claim 13 wherein said holder is configured and dimensioned to receive and maintain thereon the article.

19. The intermediate of claim 13 wherein the article is a recording medium, and said holder is configured and dimensioned to receive the recording medium.

20. The intermediate of claim 13 wherein said biasing means is of unitary, integral, one-piece construction formed in a single operation with one of said base and said holder.

21. The intermediate of claim 20 wherein said biasing means is of unitary, integral, one-piece construction formed in a single operation with said base.

22. The intermediate of claim 13 wherein said intermediate is formed of plastic only.

23. A storage package intermediate for use with a pair of panels secured together and movable between a closed storage orientation, wherein the panels are substantially overlying with a recording medium and a booklet associated with and supported by the recording medium disposed intermediate the pair of panels, and an open use orientation, wherein the panels are not substantially overlying and the article and booklet are accessible; said intermediate comprising:
(A) a fixed base formed of plastic and defining a cavity, said cavity having a bottom face configured and dimensioned to be mounted on one of the panels and an open top face, said base including means for limiting movement of said holder above a given height from said cavity bottom face and releasably securing the booklet atop a holder;
(B) a floating holder formed of rigid plastic and disposed within said cavity intermediate said faces for receiving and maintaining thereon the recording medium and receiving the booklet over the article, said holder being movable between a plurality of positions variably spaced above said cavity bottom face, said holder being configured and dimensioned to receive the recording medium; and
(C) biasing means for biasing said holder above said cavity bottom face, thereby to accommodate booklets of varying thickness and, when the booklet is removed, biasing the article towards said open cavity top face, said biasing means being of unitary, integral, one-piece construction formed in a single operation with said base.

24. The intermediate of claim 23 wherein said base defines an adjoining pair of said cavities sharing a common wall and having other walls, each of said cavities having a respective one of said holders and a respective one of said biasing means, the upper end of said common wall being disposed lower than the upper ends of the other walls of said cavities so that a booklet having a greater plan dimension than either of said cavities may be disposed above the articles on said holders and said common wall upper end, but below a plane defined by said upper ends of said other walls of said cavities when the pair of panels is in the closed storage orientation.

25. A storage package intermediate for use with an article and a booklet supported by the article; said intermediate comprising:
(A) a fixed base formed of plastic and defining a cavity with a bottom face and an open top face;
(B) a floating holder formed of rigid plastic and disposed within said cavity intermediate said faces for receiving and maintaining thereon the article and receiving the booklet over the article, said holder being movable between a plurality of positions variably spaced above said cavity bottom face; and
(C) biasing means secured to one of said base and holder for biasing said holder above said cavity bottom face, thereby to accommodate booklets of varying thickness and, when the booklet is removed, biasing the article towards said open cavity top face.

26. The intermediate of claim 25 wherein said base additionally includes means for limiting movement of said holder above a given height from said cavity bottom face.

27. The intermediate of claim 25 wherein at least one of said movement limiting means releasable secures the booklet atop said holder.

28. The intermediate of claim 25 wherein said base defines a plurality of said cavities, each of said cavities having a respective one of said holders and a respective one of said biasing means.

29. The intermediate of claim 28 wherein said base defines an adjoining pair of said cavities sharing a common wall and having other walls, the upper end of said common wall being disposed lower than the upper ends of the other walls of said cavities so that a booklet having a greater plan dimension than either of said cavities may be disposed above the articles on said holders and said common wall upper end, but below a plane defined by said upper ends of said other walls of said cavities.

30. The intermediate of claim 25 wherein said holder is configured and dimensioned to receive and maintain thereon the article.

31. The intermediate of claim 25 wherein the article is a recording medium, and said holder is configured and dimensioned to receive the recording medium.

32. The intermediate of claim 25 wherein said biasing means is of unitary, integral, one-piece construction formed in a single operation with one of said base and said holder.

33. The intermediate of claim 32 wherein said biasing means is of unitary, integral, one-piece construction formed in a single operation with said base.

34. The intermediate of claim 25 wherein said intermediate is formed of plastic only.

35. A storage package intermediate for use with a panel, a recording medium and a booklet associated with and supported by the recording medium; said intermediate comprising:
- (A) a fixed base formed of plastic and defining a cavity, said cavity having a bottom face configured and dimensioned to be mounted on a panel and an open top face, said base including means for limiting movement of said holder above a given height from said cavity bottom face and releasably securing the booklet atop a holder;
- (B) a floating holder formed of rigid plastic and disposed within said cavity intermediate said faces for receiving and maintaining thereon the recording medium and receiving the booklet over the article, said holder being movable between a plurality of positions variably spaced above said cavity bottom face, said holder being configured and dimensioned to receive the recording medium; and
- (C) biasing means for biasing said holder above said cavity bottom face, thereby to accommodate booklets of varying thickness and, when the booklet is removed, biasing the article towards said open cavity top face, said biasing means being of unitary, integral, one-piece construction formed in a single operation with said base.

36. The intermediate of claim 35 wherein said base defines an adjoining pair of said cavities sharing a common wall and having other walls, each of said cavities having a respective one of said holders and a respective one of said biasing means, the upper end of said common wall being disposed lower than the upper ends of the other walls of said cavities so that a booklet having a greater plan dimension than either of said cavities may be disposed above the articles on said holders and said common wall upper end, but below a plane defined by said upper ends of said other walls of said cavities.

* * * * *